US00RE35103E

United States Patent [19]

Van Malderghem et al.

[11] E Patent Number: Re. 35,103

[45] Reissued Date of Patent: Nov. 28, 1995

[54] TWO-PART OR THREE-PART CONTINUOUS FORM

[75] Inventors: Edward G. Van Malderghem, Westminster, Md.; John C. Eder, Hacienda Heights, Calif.

[73] Assignee: Moore Business Forms, Inc., Grand Island, N.Y.

[21] Appl. No.: 104,457

[22] Filed: Aug. 9, 1993

Related U.S. Patent Documents

Reissue of:

[64] Patent No.: 5,092,514
Issued: Mar. 3, 1992
Appl. No.: 644,466
Filed: Jan. 18, 1991

U.S. Applications:

[63] Continuation-in-part of Ser. No. 425,002, Oct. 20, 1989, abandoned, and a continuation-in-part of Ser. No. 298,329, Jan. 13, 1989, abandoned, and a continuation-in-part of Ser. No. 158,022, Feb. 12, 1989, abandoned, and a continuation-in-part of Ser. No. 28,071, Mar. 18, 1987, abandoned, and a continuation-in-part of Ser. No. 556,925, Dec. 1, 1983, abandoned.

[51] Int. Cl.[6] ..... B65D 27/10

[52] U.S. Cl. ..... 229/69; 462/6

[58] Field of Search ..... 462/2, 3, 4, 5, 462/6, 7, 8, 9; 229/69

[56] References Cited

U.S. PATENT DOCUMENTS

| | | |
|---|---|---|
| 211,725 | 1/1879 | Foster . |
| 1,159,736 | 11/1915 | Berold . |
| 2,148,886 | 2/1939 | Wanser . |
| 2,580,886 | 1/1952 | Broudy . |
| 3,092,401 | 6/1963 | Steidinger . |
| 3,104,799 | 9/1963 | Steidinger . |
| 3,197,121 | 7/1965 | Hayes, Jr. . |
| 3,339,826 | 9/1967 | Beskind . |
| 3,339,827 | 9/1967 | Steidinger . |
| 3,411,699 | 11/1968 | Pine et al. . |
| 3,437,259 | 4/1969 | Steidinger . |
| 3,476,307 | 11/1969 | Faltin et al. . |
| 3,482,780 | 12/1969 | Johnsen . |
| 3,507,444 | 4/1970 | Werby . |
| 3,523,638 | 8/1970 | Moonan . |
| 3,552,641 | 1/1971 | Bell et al. . |
| 3,756,889 | 9/1973 | Wolfberg et al. . |
| 3,790,070 | 2/1974 | Schnitzer et al. . |
| 3,837,565 | 9/1974 | Johnsen . |
| 3,941,308 | 3/1976 | Digirolomo et al. . |
| 3,995,808 | 12/1976 | Kehoe . |
| 4,050,582 | 9/1977 | Kalve . |
| 4,055,294 | 10/1977 | Traise . |
| 4,277,016 | 7/1981 | Wakeman et al. . |
| 4,320,868 | 3/1982 | Petersson . |
| 4,342,418 | 8/1982 | Meschi . |
| 4,342,472 | 8/1982 | Heimann et al. . |
| 4,343,492 | 8/1982 | Fitzgibbons . |
| 4,346,916 | 8/1982 | Shelton . |
| 4,380,315 | 4/1983 | Steidinger . |

FOREIGN PATENT DOCUMENTS

| | | |
|---|---|---|
| 513176 | 11/1980 | Australia . |
| 1502067 | 11/1967 | France . |
| 2281284 | 3/1976 | France . |
| 2387164 | 11/1978 | France . |
| 2431964 | 2/1980 | France . |
| 2163376 | 6/1976 | Germany . |
| 2645512 | 4/1977 | Germany . |
| 2655904 | 6/1977 | Germany . |
| 2900226 | 7/1980 | Germany . |
| 50-155375 | 12/1975 | Japan . |
| 51-19450 | 6/1976 | Japan . |
| 55-88941 | 6/1980 | Japan . |
| 6708451 | 12/1968 | Netherlands . |
| 7750 | of 1897 | United Kingdom . |
| 809953 | 3/1959 | United Kingdom . |
| 1564423 | 4/1980 | United Kingdom . |
| 1594798 | 8/1981 | United Kingdom . |

*Primary Examiner*—Richard K. Seidel
*Attorney, Agent, or Firm*—Nixon & Vanderhye

[57] ABSTRACT

A mailer business form assembly comprises a non-adhesive bearing message sheet and one or more adhesive-bearing cover sheets prepared for printing of the message sheet, alignment and sealing to provide multiple mailers.

8 Claims, 3 Drawing Sheets

TWO-PART OR THREE-PART CONTINUOUS FORM

Matter enclosed in heavy brackets [ ] appears in the original patent but forms no part of this reissue specification; matter printed in italics indicates the additions made by reissue.

This application is a continuation in part of application Ser. No. 07/425,002, filed Oct. 20, 1989, abandoned Mar. 27, 1991; Ser. No. 07/298,329, filed Jan. 13, 1989, abandoned Nov. 16, 1989; Ser. No. 07/158,022, filed Feb. 12, 1989, abandoned Feb. 10, 1989; Ser. No. 07/028,071, filed Mar. 18, 1987 abandoned May 16, 1988 and Ser. No. 06/556,925, filed Dec. 1, 1983, abandoned Apr. 27, 1987.

BACKGROUND AND SUMMARY OF THE INVENTION

This invention relates to business form assemblies, and more particularly, to such assemblies providing mailers.

An object of this invention is to provide an improved continuous business form assembly of at least two webs for collation and sealing into mailers.

Business forms are provided to users either in an essentially finished condition or in an intermediate condition. The finished condition is exemplified by closed and sealed mailers which are ready for mailing after the user has added his information by impact printer or ink jet printer. Intermediate condition mailers are those in which the interior of the form is exposed to the user. Information may be added to the interior of forms in the intermediate condition by impact printer. Generally, forms shipped in the intermediate condition have a heat sealable adhesive around at least a part of the periphery of the form so that the form may be finally closed and sealed. The final steps of the assembly process involve machines which fold or align the sheets of the form and subsequently apply heat and pressure to activate the heat seal glue around at least part of the periphery of the form.

In recent years, there has been a rapid growth in the use of non-impact (NIP) printers, such as laser printers, because of their versatility and variable printing. Problems have arisen, however, because the non-impact printers which use toner particles generate internal heat to fuse the particles forming the images. The higher temperatures required for fusing soften the hot melt adhesive, causing the glue on the open form to adhere to the internal rolls of the non-impact printers, thus fouling the machine. When such fouling occurs, many times the machine must be partially disassembled and cleaned. This is obviously time consuming and expensive. The present invention avoids this problem of the prior art by providing a business form assembly capable of use in conjunction with heat-generating printers. In a principal aspect, the invention is an improved business form assembly comprising a message web having a message sheet and a cover web having a cover sheet. The message sheet has a longitudinal dimension between end edges along a longitudinal axis and a transverse dimension between marginal edges along a transverse axis. Marginal lines of perforations extend along the marginal edges fully between the end edges. Tranverse, end lines of perforations extend along the end edges only between the marginal lines of perforations. No adhesive is present on any portion of the message sheet.

The message cover sheet has a longitudinal dimension between cover sheet end edges equal to the longitudinal dimension of the message sheet, and a transverse dimension between cover sheet marginal edges equal to the transverse dimension of the message sheet. The cover sheet is superimposed upon the message sheet and has marginal lines of adhesive along the cover sheet marginal edges. These adhesive lines extend fully between the cover sheet end edges and are nearer the cover sheet marginal edges than the message sheet marginal perforation lines are to the message sheet marginal edges. Transverse, end lines of adhesive are along the cover sheet end edges, extending fully between the cover sheet marginal edges and being nearer the cover sheet end edges than the message sheet end perforation lines are to the message sheet end edges. Preferably, cover sheet marginal and transverse, end lines of perforations are superimposed on the message sheet marginal and transverse, end lines of perforations. The marginal and end lines of adhesive adhere the cover sheet to the message sheet.

Other objects, advantages and features are part of the detailed description of the preferred embodiment. The detailed description follows a brief description of the drawing.

BRIEF DESCRIPTION OF THE DRAWING

The preferred embodiment of the present invention will be described in relation to the accompanying drawing, in which.

DETAILED DESCRIPTION OF THE PREFERRED EMBODIMENT

Figure 1:
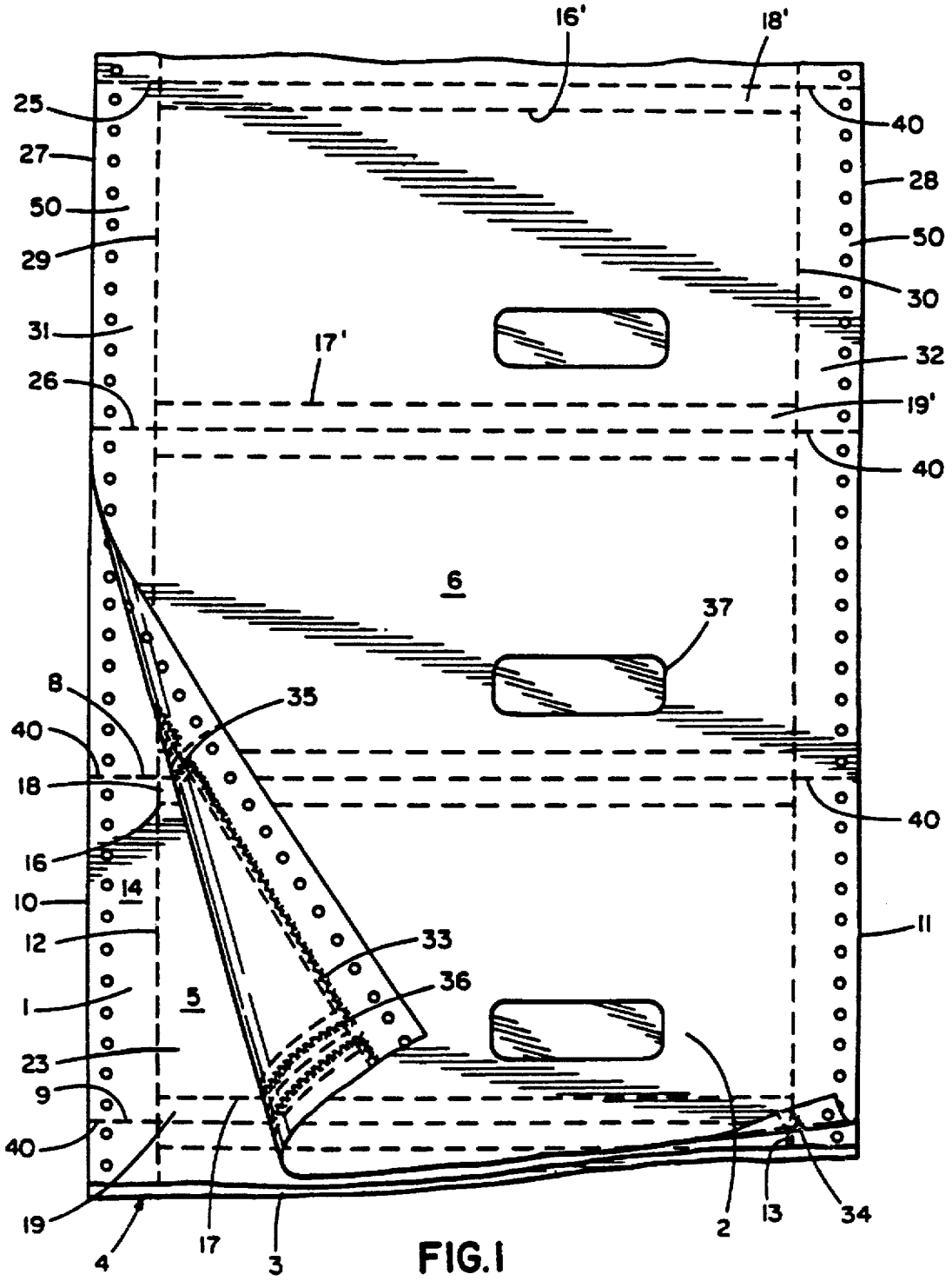
FIG. 1 is a plan view of a preferred mailer of the invention, with a corner of a cover sheet turned back to reveal detail.
Figure 2:
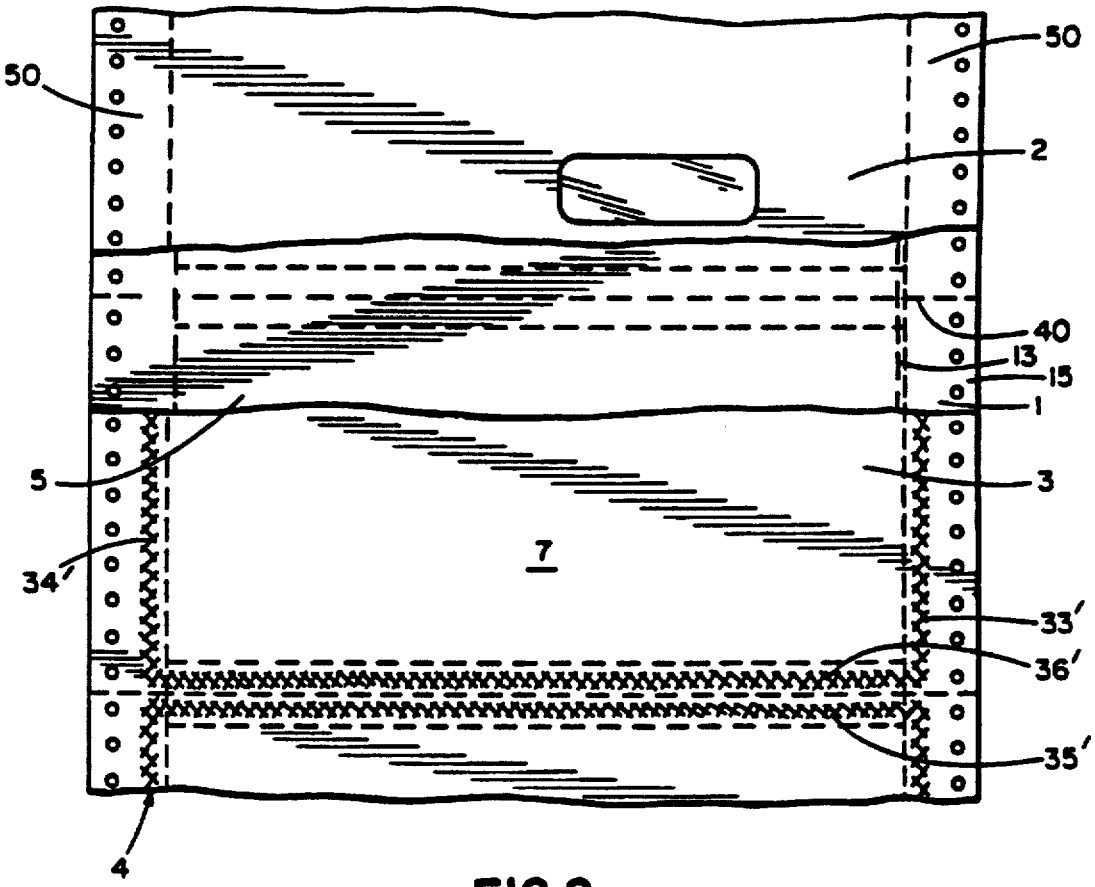
FIG. 2 is a second plan view of the mailer of FIG. 1, with the cover sheet and message sheet shortened to reveal detail; and, FIG. 3 is a schematic diagram illustrating use of the business form assembly of the present invention in the intermediate condition, depicting printing of the message sheet of the business form assembly with a computer controlled Non-Impact Printer (NIP) as well as collation, sealing and separation of the business form assemblies for mailing.

Referring to FIGS. 1–2, the preferred embodiment of the invention is a business form assembly 4 comprising a message web 1, a cover web 2 and a back web 3. The webs 1, 2, 3 have superimposed, spaced series of transverse, margin-to-margin perforation lines 40; and superimposed, marginal feed strips 50. The webs 1, 2, 3 provide mailers, each mailer extending between adjacent perforation lines 40. Each mailer comprises a message sheet 5, a top cover sheet 6 and a bottom cover sheet 7. As will be described, when the assembly 4 is completed, the sheets 5, 6, 7 are adhered to each other totally about their peripheries and across their centers.

The message sheet 5 is rectangular. It has a longitudinal dimension between a straight upper end edge 8 and a straight and parallel lower end edge 9. It has a transverse dimension between straight, parallel, marginal edges 10, 11. The sheet 5 has (and also the sheets 6, 7 have) pin feed holes in the feed strips 50.

A first message sheet marginal line of perforations 12 extends along and spaced from the first message sheet marginal edge 10. A second message sheet marginal line of perforations 13 extends along and spaced from the second message sheet marginal edge 11. The lines 12, 13 extend longitudinally, fully between the message sheet end edges 8, 9. The marginal edge 10 and line 12 define a first longitudinally extending margin 14 of the sheet 5. The edge 11 and line 13 define a second longitudinally extending margin 15.

A first, transverse end line of perforations 16 extends along but spaced from the end edge 8. A second, transverse end line of perforations 17 extends along but spaced from the end edge 9. The lines 16, 17 extend only between the marginal perforation lines 12, 13. The edges 8, 9 and lines 16, 17 define end strips 18, 19 on the sheet 5. Preferably, end strips 18, 19 have longitudinal widths approximately equal to each other. No adhesive is present on either side of sheet 5.

The lines 12, 13, 16, 17 define a message area 23. The top cover sheet 6 has a longitudinal dimension between top cover sheet end edges 25, 26 equal to the longitudinal dimension of the message sheet 5 between its edge ends 8, 9. The top cover sheet 6 also has a transverse dimension between top cover sheet marginal edges 27, 28 equal to the transverse dimension of the message sheet 5 between its marginal edges 10, 11. Marginal lines of perforations 29, 30 extend longitudinally along the top cover sheet marginal edges 27, 28. The lines 29, 30 define marginal strips 31, 32 on the sheet 6, which have a transverse width less than the width of the message sheet margins 14, 15.

A first, transverse end line of perforations 16' extends along and spaced from the end edge 25. A second, transverse end line of perforations 17' extends along and spaced from the end edge 26. The lines 16', 17' extend only between the marginal lines of perforations 29, 30. The edges 25, 26 and lines 16', 17' define end strips 18', 19' on the sheet 6.

Within the marginal strips 31, 32, the sheet 6 has marginal lines of adhesive 33, 34. The adhesive lines 34 extend *substantially* fully between the top cover sheet end edges 25, 26. The adhesive lines are joined along the end edges 25, 26 by transversely extending, end lines of adhesive 35, 36. The lines 35, 36 are within the end strips 18', 19'. The adhesive lines 33, 34, 35, 36 circumscribe the periphery of the sheet 6. As most preferred. the adhesive lines 33–36 are a heat sealable adhesive. When heated, with the sheets 5, 6 separated from their webs or not, and the sheet 6 superimposed on the sheet 5, the adhesive adheres sheet 6 to sheet 5, outward of the perforation lines 12, 13, 16, 17 of the sheet 5 and in the margins 14, 15 and end strips 18, 19. The perforation lines 12, 13, 16, 17, 29, 30, 16', 17' remain useful to separate the message areas from the margins 14, 15 and end strips 18, 19. Pressure sensitive or remoistenable adhesive may be employed as an alternate to the heat sealable adhesive.

The sheets 5 and 6, so adhered, form a mailer assembly useful with or without the sheet 7. If used without the sheet 7. the assembly forms a message unit. Each message unit remains sealed, and may be opened by removal of the top cover sheet marginal strip 31, with the message sheet margin 14, along the perforation lines 29, 12. Since the perforation line 29 is offset from the line 12, an edge is created that can be manually grasped. A message area, such as 223, may then be separated from its message unit, along other perforation lines. As most preferred, all the transverse perforation lines 16, [20, 21,] *16', 17'*, 17 are progressive, in that perforation size is large toward the edge 10, and is progressively reduced toward edge 11. These progressive perforations facilitate separation of the message areas.

When the assembly has a back cover sheet, the preferred back cover sheet 7 has longitudinal and transverse dimensions equal to those of the cover sheet 6. The sheet 7 also has a pattern of adhesive lines identical to that of sheet 6, and the same reference numbers (with primes) are used to identify the adhesive lines on sheet as are used on sheet 6. The sheet 7 may be a combined second message and bottom cover sheet, and may be a reversed, or turned over, duplicate of sheet 6, without the glassine window.

Figure 3:
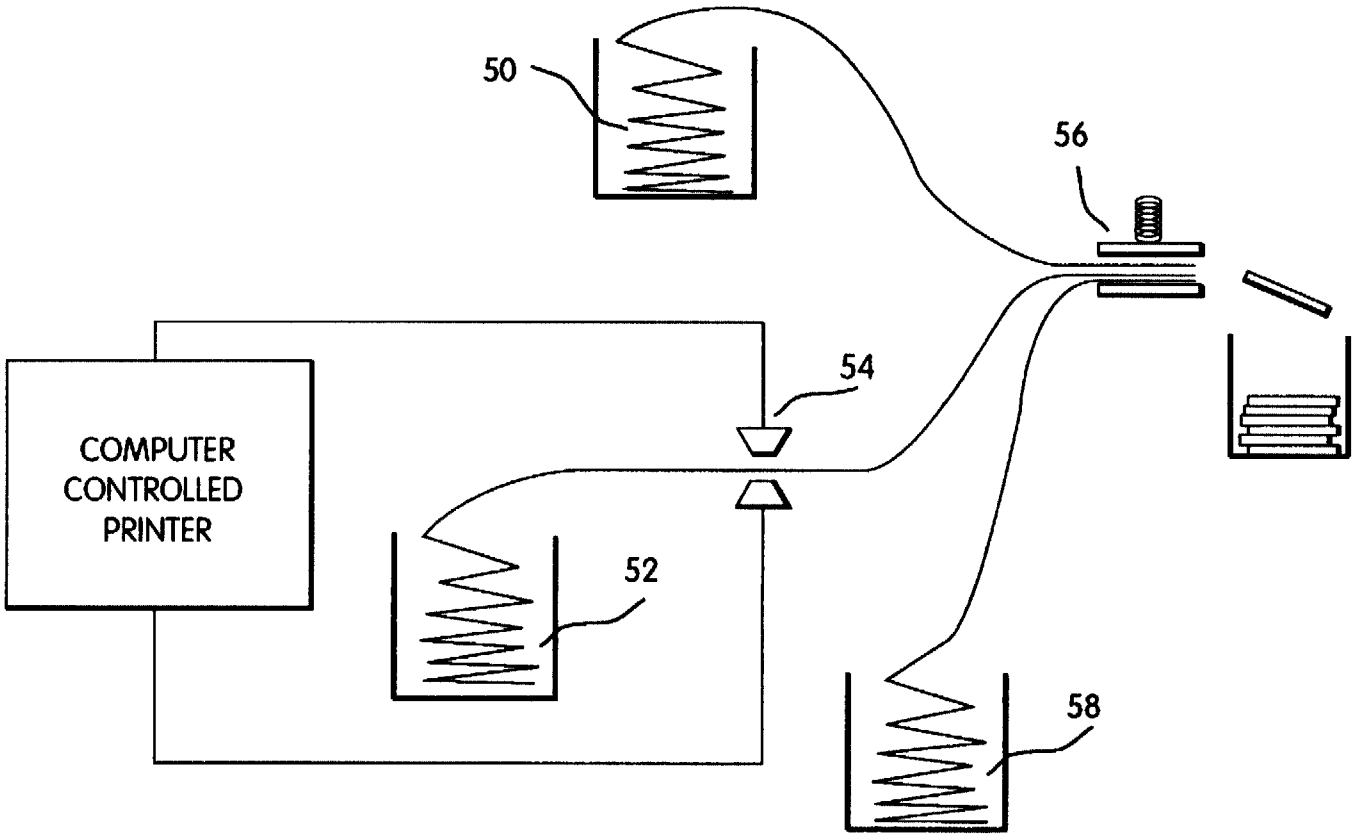

Referring now to FIG. 3, the use of the assembly in the intermediate condition is disclosed. In the intermediate condition, the cover sheet web 50 and the message sheet web 52 are provided separately. If a back cover sheet is used, the back cover sheet web 58 is also provided separately. The mailer assembly process is arranged such that the message sheet web 52 passes through printer M, where the message is added. The adhesive-bearing cover sheet web 50, and back cover sheet web 58, if included, do not pass through the printer but are superimposed on the printed message sheet and fed into a collating and sealing machine where the webs are joined, scaled and detached as finished forms ready to be mailed.

The preferred embodiment of the invention is now described. If preferred, the message units may be self-contained envelopes with transparent-covered windows, such as windows 36, 37, shown on sheet 6.

The preferred embodiment may be varied, without departing from the invention. Therefore, to particularly point out and distinctly claim the subject matter regarded as invention, the following claims conclude this specification.

What is claimed is:

1. An improved business form assembly kit, provided in an intermediate condition, comprising:

a message web having a series of spaced, transverse perforation lines and a plurality of message sheets between the transverse perforation lines, each message sheet having end edges along the transverse perforation lines, marginal edges, a longitudinal dimension between the end edges along a longitudinal axis, and a transverse dimension between the marginal edges along a transverse axis, marginal lines of perforations along the marginal edges of the message sheet extending fully between the end edges, transverse, end lines of perforations extending along and spaced from the end edges between the marginal lines of perforations; and an independent cover web having a series of spaced cover web transverse perforation lines and a plurality of cover sheets between the cover web transverse perforation lines, marginal lines of perforations defining cover sheet marginal strips, each cover sheet having cover sheet end edges along the cover web transverse perforation lines, cover sheet marginal edges, a longitudinal dimension between the cover sheet end edges equal to the longitudinal dimension of the message sheet, a transverse dimension between the cover sheet marginal edges equal to the transverse dimension of the message sheet and transverse perforation lines extending between the cover sheet marginal strips defining cover sheet end strips;

the cover sheet of suitable dimensions to be superimposed upon the message sheet and further having marginal lines of heat sealable adhesive along the cover sheet marginal edges extending fully between the cover sheet end edges and being nearer the cover sheet marginal edges than the message sheet marginal lines of perforations are to the message sheet marginal edges, transverse, end lines of heat sealable adhesive along the cover sheet end edges extending fully between the cover sheet marginal edges and being nearer the cover sheet end edges than the message sheet end lines of perforations are to the message sheet end edges, the marginal and end lines of heat sealable adhesive located so as to first adhere the cover sheet to the message sheet in [the] *a* collating and sealing machine.

2. The business form [mailer] assembly *kit* of claim 1 in an intermediate condition wherein the message sheet is provided free of adhesive.

3. The improved [continuous] business form assembly kit, provided in an intermediate condition, of claim 1, further comprising:

an independent back cover web having a series of spaced back cover web transverse perforation lines and a plurality of back cover sheets between the back cover web transverse perforation lines, marginal lines of perforations defining back cover sheet marginal strips, each back cover sheet having back cover sheet end edges along the back cover web transverse perforation lines, back cover sheet marginal edges, a longitudinal dimension between the back cover sheet end edges equal to the longitudinal dimension of the message sheet, a transverse dimension between the back cover sheet marginal edges equal to the transverse dimension of the message sheet and transverse perforation lines extending between the back cover sheet marginal strips defining back cover sheet end strips;

the back cover sheet of suitable dimensions to be superimposed upon the message sheet and further having marginal lines of heat sealable adhesive along the back cover sheet marginal edges extending fully between the back cover sheet end edges and being nearer the back cover sheet marginal edges than the message sheet marginal lines of perforations are to the message sheet marginal edges, transverse, end lines of heat sealable adhesive along the back cover sheet end edges extending fully between the back cover sheet marginal edges and being nearer the back cover sheet end edges than the message sheet end lines of perforations are to the message sheet end edges, the marginal and end lines of heat sealable adhesive located so as to first adhere the back cover sheet to the message sheet in the collating and sealing machine.

*4. The business form assembly kit of claim 1 wherein the marginal line of perforations defining a cover sheet marginal strip along one side of said cover sheet is nearer the marginal edge of said cover sheet along said one side thereof than a marginal line of perforations along a side of the message sheet corresponding to said one side of said cover sheet is to a message sheet marginal edge along said corresponding side such that, when the heat sealable adhesive adheres the cover sheet to the message sheet in the collating and sealing machine, an edge is created on the cover sheeet to enable grasping of the cover sheet.*

*5. An improved business form assembly kit, provided in an intermediate condition, comprising:*

*a message web having a series of spaced, transverse perforation lines, each message sheet having end edges along the transverse perforation lines, a marginal edges, a longitudinal dimension between the end edge along a longitudinal axis, and a transverse dimension between the marginal edges along a transevers axis, marginal lines of perforations along and spaced from the marginal edges of the message sheet extending fully between the end edges to define marginal strips, transverse, end lines of perforations extending along and spaced from the end edges between the marginal lines of perforations; and*

*an independent cover web having a series of spaced cover web transverse perforation lines and a plurality of cover sheets between the cover web transverse perforation lines, each cover sheet having cover sheet end edges along the cover web transverse perforation lines, cover sheet marginal edges, marginal lines of perforation extending along and spaced from said cover sheet marginal edges to define therewith cover sheet marginal strips, a longitudinal dimension between the cover sheet end edges equal to the longitudinal dimension of the message sheet, a transverse dimension between the cover sheet marginal edges equal to the transverse dimension of the message sheet and transverse perforation lines extending between the cover sheet marginal strips defining cover sheet end strips;*

*the cover sheet of suitable dimensions to be superimposed upon the message sheet and further having marginal lines of heat sealable adhesive along the cover sheet marginal strips extending substantially fully between the cover sheet end edges and being nearer the cover sheet marginal edges than the message sheet marginal lines of perforations are to the message sheet marginal edges, transverse, end lines of heat sealable adhesive along the cover sheet end strips extending substantially fully between the cover sheet marginal edges and being nearer the cover sheet end edges than the message sheet end lines of perforations are to the message sheet end edges, the marginal and end lines of heat sealable adhesive located so as to adhere the cover sheet to the message sheet in in final assembly thereof.*

*6. The business form mailer assembly kit of claim 5 wherein the marginal line of perforations defining a cover sheet marginal strip along one side of said cover sheet being nearer the marginal edge of said cover sheet along said one side thereof than a marginal line of perforations along a side of the message sheet corresponding to said one side of said cover sheet is to a message sheet marginal edge along said corresponding side such that, when the heat sealable adhesive adheres the cover sheet to the message sheet in the collating and sealing machine, an edge is created to enable grasping of the cover sheet.*

*7. A business form assembly, provided in an intermediate condition, comprising:*

*a message web having a series of spaced, transverse perforation lines and a plurality of message sheets between the transverse perforation lines, each message sheet having end edges along the transverse perforation lines, marginal edges, a longitudinal dimension between the end edges along a longitudinal axis, and a transverse dimension between the marginal edges along a transverse axis, marginal lines of perforations along and spaced from the marginal edges of the message sheet extending fully between the end edges to define marginal strips, transverse, end lines of perforations extending along and spaced from the end edges between the marginal lines of perforations; and*

*an independent cover web havinq a series of spaced cover web transverse perforation lines and a plurality of cover sheets between the cover web transverse perforation lines, each cover sheet having cover sheet end edges along the cover web transverse perforation lines, cover sheet marginal edges, a marginal line of perforations extending along and spaced from at least one of said cover sheet marginal edges to define therewith at least one cover sheet marginal strip, a longitudinal dimension between the cover sheet end edges equal to the longitudinal dimension of the message sheet, a transverse dimension between the cover sheet marginal edges equal to the transverse dimension of the message sheet;*

*the cover sheet of suitable dimensions to be superimposed upon the message sheet and further having marginal heat sealable adhesive along and adjacent to the marginal edges of said cover sheet including along said at least one cover sheet marginal strip, said marginal heat sealable adhesive extending substantially between the cover sheet end edges and being nearer the cover sheet marginal edges than the message sheet marginal lines of perforations are to the message sheet marginal edges, heat sealable adhesive along and adjacent to the*

*cover sheet end edges between the cover sheet marginal edges and being nearer the cover sheet end edges than the message sheet end lines of perforations are to the message sheet end edges, the marginal heat sealable adhesive and the end edge of heat sealable adhesive being located to enable the cover sheet and the message sheet to be secured to one another in a final assembly thereof.*

*8. The business form assembly according to claim 7 wherein the message web is void of adhesive.*

* * * * *